May 13, 1958 W. BILL 2,834,334
OVEN RACK WITH RAISABLE SHELF PORTION
Filed July 30, 1956 2 Sheets-Sheet 1

Inventor
William Bill
by Andrew B. Hubbard
Attorney

May 13, 1958 W. BILL 2,834,334
OVEN RACK WITH RAISABLE SHELF PORTION
Filed July 30, 1956 2 Sheets-Sheet 2

Inventor
William Bill
by Andrew B. Hubbard
Attorney

United States Patent Office 2,834,334
Patented May 13, 1958

2,834,334

OVEN RACK WITH RAISABLE SHELF PORTION

William Bill, Chicago, Ill., assignor to General Electric Company, a corporation of New York Application July 30, 1956, Serial No. 600,799

2 Claims. (Cl. 126—41)

This invention relates to an oven rack having means for adjustably elevating a shelf portion relative to the broiler element of a cooking range or the like.

Although it would appear to be a very simple matter to provide a broiler pan elevating mechanism, previous arrangements have been deficient in that the extreme heat to which the mechanism is subjected tends to expand and warp various operating components, with the result that the elevating mechanism may bind; and the manufacturing tolerances of mass-produced appliances may accumulate with resulting misalignment of parts and difficulty of operation. Also, previously known elevatable broiler racks have embodied base structures fixed to the oven walls or floor. Such structures accumulate dirt and grease, and are difficult to maintain in a clean and sanitary condition.

It is an object of the invention to provide an oven rack having means for elevating a broiler pan or the like relative to a broiler element, said means embodying an elevating mechanism which will not jam or bind under operating conditions.

It is another object of the invention to provide an oven rack as aforesaid in which the elevating mechanism will operate satisfactorily even in the event of misalignment of operating components, and therefore may be manufactured by unskilled labor incapable of maintaining accurate or close tolerances.

It is a further object of the invention to provide an oven rack having an elevatable broiler pan shelf, said rack and elevating mechanism being self-contained, useful also as a conventional oven baking rack, and removable from the oven for cleaning.

In a presently preferred embodiment, an oven rack embodying the invention comprises a base frame structure having longitudinal rails for slidable support by the oven side walls and an elevatable shelf mounted on said frame structure by a pantograph linkage which permits elevation while maintaining the parallel relation of shelf and frame. A guide member operatively associated with the frame and the shelf has rigid elements which swivelly engage a travelling nut on an elevating screw carried by the frame structure. The guide member serves both to maintain the operating relationship of the frame structure and shelf and to serve as the mechanism to translate the travel of the nut into elevation of the shelf. The free-floating relationship of the guide member and elevating nut makes it possible to have the nut ride on its associated screw with adequate thread clearance to insure against binding, and also provides a high degree of self-adjustability which compensates for misalignment of the mechanical components. A feature of the mechanism is that the load on the shelf enforces an adjustment of the nut on the screw so that the load is taken by the full helix of the thread of the screw.

Other features and advantages will be understood from the following detailed description of a presently preferred embodiment, read in connection with the accompanying drawings in which.

Figure 1:
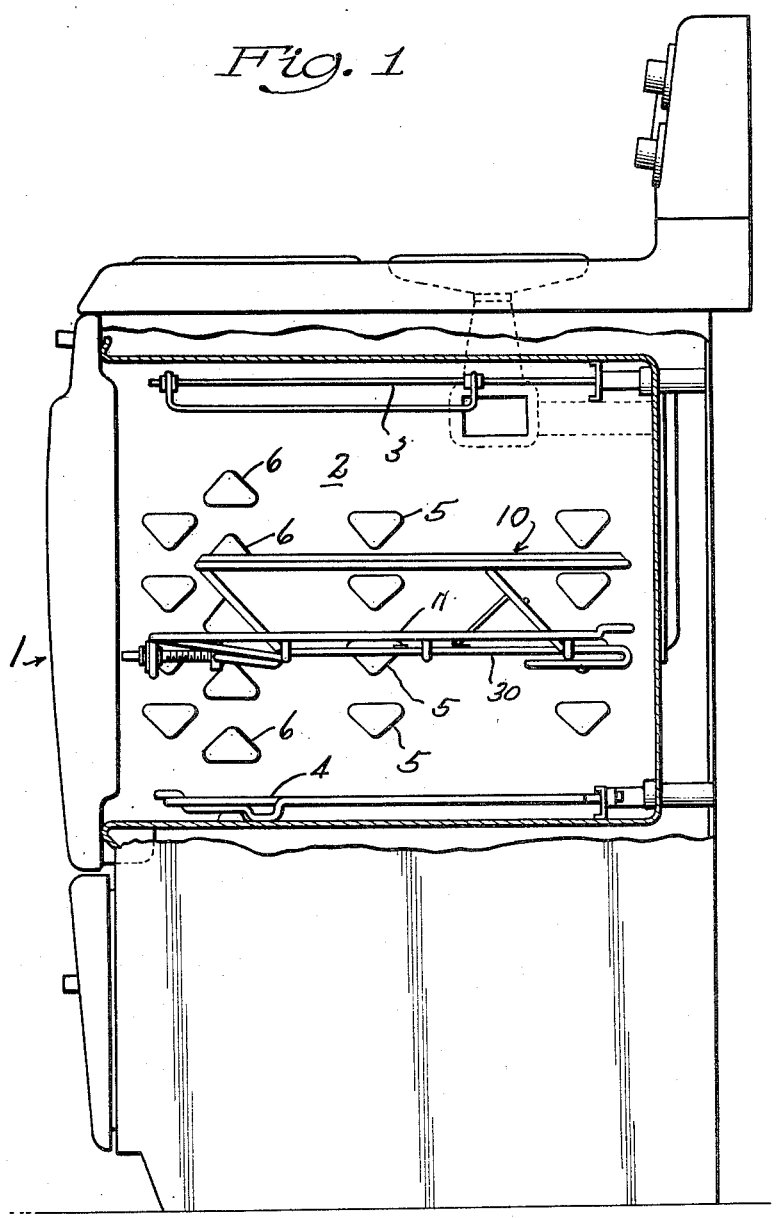
Fig. 1 is a side elevation of an electric cooking range with the oven portion in section, and showing a preferred embodiment of the invention mounted in an operating position in the oven.

In Fig. 1, an electric range 1 of conventional construction has an oven cavity 2 provided with a conventional upper heating element 3 and lower heating element 4. The upper heating element may be used for baking in association with the lower heating element and also independently as the sole heat source for broiling.

The oven side wall has a plurality of embosses 5 and 6, arranged to establish several levels on which an oven rack may be slidably supported. The rack is actually supported on the embosses 5; the embosses 6 stabilize the rack to prevent it from tipping as it is brought forward for placing or removing the foodstuff carried thereon.

Figure 2:
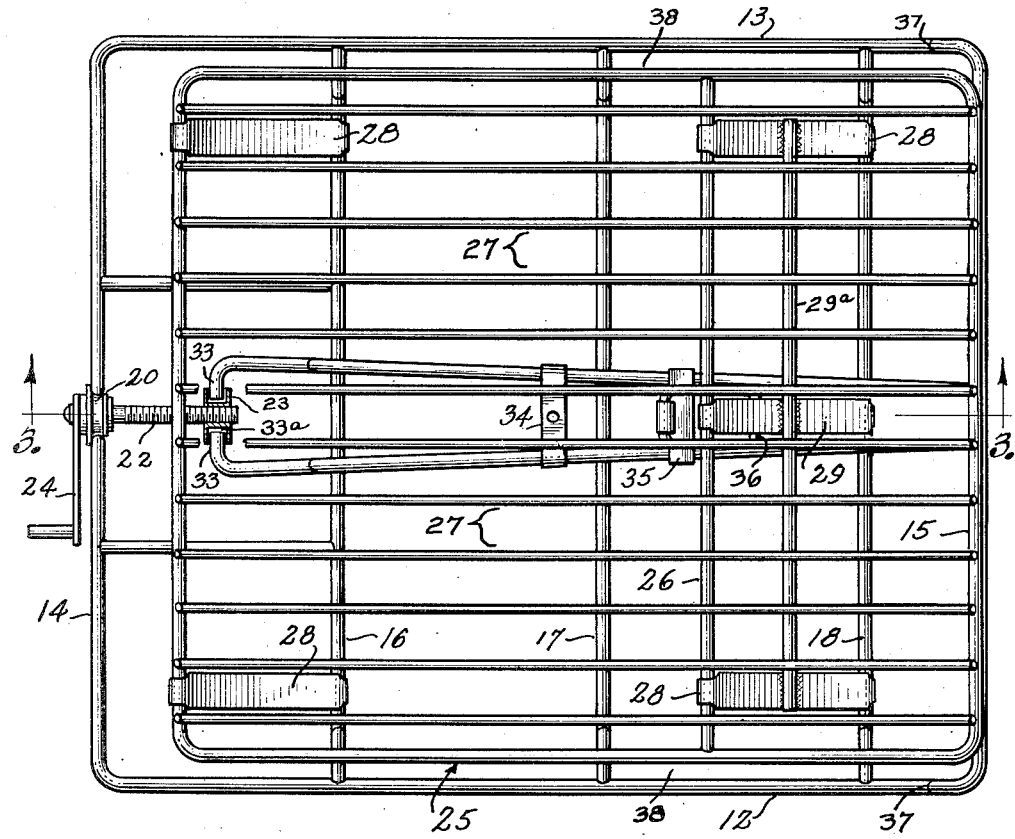
Fig. 2 is a top plan view, partly in section, of a rack embodying the invention.
Figure 3:
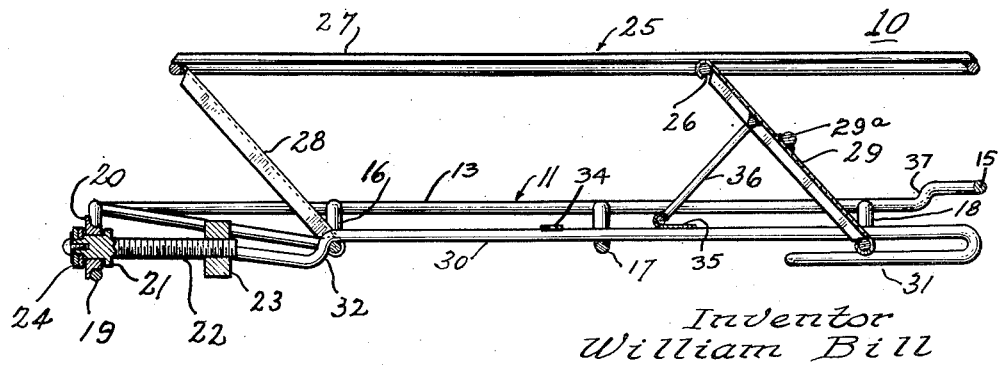
Fig. 3 is a side elevation of the invention showing the shelf in maximum elevated position relative to the base frame.

The rack 10 embodying the present invention is shown in Fig. 1 on one of the intermediate levels of embosses 5. Said rack, as best shown in Figs. 2 and 3, comprises a base frame and an elevatable shelf operatively associated by a guide member. For example, the base frame 11 is advantageously formed of welded rod stock, and has longitudinally extending side rails 12, 13 and transversely extending front and rear members 14, 15. Additionally, the frame has intermediate transverse bracing members 16, 17, 18, which, as shown in Fig. 3, are downwardly offset to have the major portion of their length below the plane of the side rails 12 and 13. The bracing members, however, occupy a common plane.

The front rail 14 is formed with a downwardly extending loop portion 19, which embraces and secures a bearing 20, said bearing being brazed or otherwise permanently affixed to the loop 19. The bearing rotatably confines the head portion 21 of a screw 22, said screw being positioned in parallel relationship with the frame rails 12 and 13. A travelling nut 23 is carried by the screw 22. The thread of the screw is at a rather sharp pitch, so that the nut may be moved to the extremes of the screw with relatively few turns of the screw. A crank 24 is fixed to the screw for convenience in rotating the same. Said crank is convenient to the user of the cooking range when the oven door is opened.

The shelf 25 is a quadrilateral structure having a single intermediate transverse member 26 and a plurality of longitudinal rods 27 which provide the platform for the boiling or baking pan (not shown). The shelf is affixed to the frame 11 for parallel movement relative thereto by means of the four identical links 28 hingedly associated with the transverse frame members 16 and 18, and with the front transverse member and the intermediate transverse member of the shelf, as appears in Fig. 3. A link 29, which is advantageously of channel formation for proper rigidity, is pivotally attached to the transverse frame member 18 and to the member 26 of the shelf. The bar 29a secures the link 29 to the two right-hand links 28, as viewed in Fig. 2, whereby the link 29 comprises an element of the parellel-linkage mechanism.

The guide or actuator 30 is advantageously formed in one piece from relatively rigid rod stock. It is substantially U-shaped and, as best shown in Fig. 3, the closed end 31 is bent back on itself, whereby slidably to embrace the center portion of the transverse bar 18 of the frame. This arrangement effectively maintains the main portion of the guide on the bars 16 and 17, thus keeping the guide in parallel relation to the frame 11. At its forward portion—that is, the left portion, as viewed in Fig. 3—the guide is sharply downwardly offset to provide a stop 32 which by engaging the bar 16 limits the rightward movement of the guide. The free end portions 33 rotatably enter holes 33a formed in diametrically opposite sides of the nut 23 to permit relative rotation between the nut and the guide. The relation of said end portions to the nut has been exaggerated in the drawing to emphasize that there is actually freedom for relative movement of the nut rotatively on the screw as well as two planes of movement of the guide end portions relative to the nut. The openings in the nut are preferably coincident with the axis of the screw 22. Although the stock from which the guide is formed is essentially rigid, a welded tie 34 further strengthens the structure against spreading at its open end and thus prevents the separation of the end portions 33 from the nut 23. An additional tie member 35 provides for the pivotal attachment of the actuating tie 36 which also is pivotally secured to the link 29. The actuating tie 36 is advantageously formed of wire to have a bight pivotally secured to the tie member 35 and having free end portions entering appropriately notched openings in the side flanges of the channel-shaped link 29, as appears in Fig. 3. The guide member 30, the link 29 and the tie 36 collectively form the shelf-actuating linkage means.

It is obvious that rotation of the screw 22 effects movement of the guide 30, thus causing the raising or lowering of the shelf 25 according to the direction of rotation of the screw. It will be observed that the weight of the foodstuff on the shelf 25 results in a downward and rearward thrust on the guide 30; the rearward thrust component of the effort being greater when the shelf is at less elevation relative to the frame. The downward component of the thrust is, of course, absorbed by the transverse supporting members 16, 17, and 18. The rearward component is transmitted directly to the nut 23. A prime advantage of the present construction is that manufacturing tolerances can be broad, particularly with respect to the alignment and centering of the screw 22. The freedom of movement of the nut on the screw and the relative adjustability of the nut and the guide members insure easy operation of the mechanism in spite of misalignment of the components. In particular, it has been found that the nut inevitably adjusts to a position in which it is in engagement with the full helix of the thread of the screw. It has been found, also, that in spite of the high temperatures of operation and possible differences of expansion of the components, the freedom of movement and adjustment provides non-binding operation.

It will be noted from Figs. 2 and 3 that the side rails 12 and 13 of the frame member are upwardly offset, as at 37, to provide a stop or shoulder which will engage with the embosses 6 at the oven side walls to stabilize the rack. When the shelf 25 is in its lowest position, its upper surface is substantially in the upper plane of the side rail offsets. However, as shown in Fig. 2, the shelf 25 is made narrower than the frame 11, so as to provide a space 38 at each side which is greater than the extent of projection of the embosses 6. Therefore the shelf may be completely lowered and used as a conventional oven baking rack, easily removable from the oven for cleaning or the like.

While there has been described what is at present considered to be the preferred embodiment of the invention, it will be understood that various modifications may be made therein, and it is intended to cover in the appended claims all such modifications as fall within the scope of the invention.

I claim:

1. In an oven rack having a rectangular base framework including a plurality of transversely extending structural members and a shelf structure having linkage means pivotally attached to said framework for elevating said shelf in parallel relation to said base framework; the combination of an elongated U-shaped guide member slidably supported by said transversely extending structural members, said guide member being of rod-like material and at its closed end being bent back on itself about one of said transverse members to provide upper and lower portions of said guide member in spaced mutually parallel relation with said transverse member confined therebetween, a rigid actuating member pivotally connecting said guide member and said linkage means to rotate the latter according to the direction of movement of said guide member relative to said base framework, a screw rotatably mounted relative to said base framework and extending longitudinally of said guide member, a nut on said screw, said nut having apertures in diametrically opposite sides thereof, the free ends of said guide member being angularly offset to enter the respective apertures to mechanically connect said nut and said guide member, the said free ends being of less diameter than the diameter of said nut apertures whereby said nut is permitted a limited rotation relative thereto, and means for rotating said screw to effect displacement of said nut and said guide member relative to said base framework and said linkage means.

2. In an oven rack having a rectangular base framework including a plurality of transversely extending structural members, a shelf structure, and parallel-linkage means pivotally connecting said framework and said shelf structure for elevating the latter; the combination of a guide member slidably supported on said transverse members for movement in directions normal thereto, an end of said guide member extending downwardly about one of said transverse members in a reverse bend to establish upper and lower portions of said guide member in spaced mutually parallel relation with said one transverse member confined therebetween, a rigid actuating member pivotally secured to said guide member intermediate the ends thereof and to said parallel-linkage means to rotate the same according to the direction of movement of said guide member, a screw rotatably mounted relative to said framework and extending longitudinally of said guide member, a nut on said screw, said nut having apertures on diametrically opposite sides thereof, a rigid element extending into each aperture from said guide member and being freely rotatable therein, the size of said elements relative to said apertures being such as to permit limited movement of said nut in a plane normal to the plane of movement of said guide member, and means to rotate said screw to enforce movement of said nut and said guide member relative to said base framework.

References Cited in the file of this patent

UNITED STATES PATENTS

| | | |
|---|---|---|
| 483,921 | Hibbs | Oct. 4, 1892 |
| 900,202 | Pugh | Oct. 6, 1908 |
| 1,352,352 | Caswell | Sept. 7, 1920 |
| 1,941,301 | Hanson et al. | Dec. 26, 1933 |
| 1,986,035 | Wells | Jan. 1, 1935 |
| 2,376,640 | Wall et al. | May 22, 1945 |
| 2,423,863 | Wales | July 15, 1947 |
| 2,466,360 | Bitney | Apr. 5, 1949 |
| 2,477,305 | Leighton | July 26, 1949 |
| 2,587,067 | Sachtleber | Feb. 26, 1952 |
| 2,641,247 | Genebach | June 9, 1953 |